United States Patent [19]

Rohrer

[11] 4,246,105

[45] Jan. 20, 1981

[54] METHOD FOR THE REDUCTION OF THE CHEMICAL OXYGEN DEMAND OF WATER AND WASTE WATER BY CATALYTIC OXIDATION AND USE OF SUCH METHOD

[76] Inventor: Ernst Rohrer, Boden, Buchs, Switzerland

[21] Appl. No.: 64,494

[22] Filed: Aug. 7, 1979

Related U.S. Application Data

[63] Continuation of Ser. No. 895,390, Apr. 11, 1978, abandoned.

[30] Foreign Application Priority Data

Apr. 14, 1977 [CH]   Switzerland ...................... 4659/77

[51] Int. Cl.³ ................................................ C02F 1/74
[52] U.S. Cl. ..................................... 210/763; 210/764
[58] Field of Search .................... 210/63 Z, 50, 63 R, 210/64; 422/121

[56] References Cited

U.S. PATENT DOCUMENTS

| | | | |
|---|---|---|---|
| 2,271,792 | 2/1942 | Conant | 422/121 |
| 3,910,778 | 10/1975 | Shahgholi et al. | 422/121 X |
| 4,007,118 | 2/1977 | Ciambrone | 210/63 Z |
| 4,012,321 | 3/1977 | Koubek | 210/63 R |
| 4,029,578 | 6/1977 | Turk | 210/63 Z |

OTHER PUBLICATIONS

Rohrer, "Catalytically Assisted Oxidation Processes," *Chemistry and Industry,* Oct. 15, 1977, pp. 816-821.

*Primary Examiner*—Thomas G. Wyse
*Attorney, Agent, or Firm*—Lane, Aitken, Ziems Kice & Kananen

[57] ABSTRACT

A method of reducing the chemical oxygen demand or requirement of water and waste water charged with oxidizable substances, by continuous catalytic oxidation. There is used as a promoter excited, dissociated and/or at least partially ionized gases and/or gas mixtures in a quantity such that there are formed a sufficient number of free radicals which initiate the oxidation and also continuously regenerate or reactivate the consumed catalyst. The method is especially useful for producing potable or drinkable water.

13 Claims, No Drawings

METHOD FOR THE REDUCTION OF THE CHEMICAL OXYGEN DEMAND OF WATER AND WASTE WATER BY CATALYTIC OXIDATION AND USE OF SUCH METHOD

This is a continuation of application Ser. No. 895,390 filed Apr. 11, 1978, abandoned.

BACKGROUND OF THE INVENTION

The present invention relates to a new and improved method of reducing the chemical oxygen requirement or demand by catalytic oxidation in water which is charged with oxidizable substances. The invention further pertains to the use of the method, particularly for producing potable or drinkable water.

It is known to the art that organic and inorganic contaminants in waste water can be decomposed or otherwise degraded by chemical oxidation.

The state-of-the-art exemplifying this technology has been documented, by way of example, in the following patents and publications:

U.S. Pat. No. 3,442,802
U.S. Pat. No. 3,487,016
Journal WPCF, 48, 920 (1976)
Journal WPCF, 45, 221 (1973) and so forth.

There has been described the use of manganese dioxide at room or elevated temperatures, at atmospheric or increased pressure. Yet, these techniques are more concerned with absorption of the substances at the so-called catalyst which then must consequently experience a special regeneration through the use of oxygen at elevated temperatures, amounting to as much as 300° C. A similar mechanism is employed for the so-called catalysis with activated carbon.

Generally, it has been observed that most contaminants contained in water can only be oxidized extremely slowly and incompletely at ambient temperature by means of molecular oxygen. The heretofore recommended catalysts do not change anything as concerns this basic fact. The use of elevated temperatures and pressures up to and exceeding 100 bar can hardly be practically realized, particularly owing to the poor economies which prevent such application in practice, and especially when there are processed larger quantities of water.

The use of more strongly oxidizing agents than the molecular oxygen is obvious. Attempts have been made to use hydrogen peroxide, chromate and other acids, potassium permanganate, ozone and so forth alone and in combination with catalysts. Also it has been attempted to carry out chloro-oxidation alone or by means of radiation. All of these techniques, at the very best, are suitable for waste water which is only slightly contaminated with oxidizable substances. As soon as the waste load becomes greater they no longer are tolerable techniques owing to the involved operating costs.

The use of gaseous oxygen or oxygen containing-gas mixtures, for instance atmospheric air, is freely available in contrast to such oxidizing agents, and furthermore, has the advantage that any over dosage does not exert any adverse effect upon the water.

To a certain degree oxygen is a bi-radical and as such possesses a somewhat increased reaction capability. Therefore, a whole spate of organic compounds can be directly oxidized by oxygen, generally while forming peroxides or hydroperoxides. The speed of oxidation is not only dependent upon the time needed to form the peroxide, rather also upon the decomposition speed. Generally, such auto-oxidation is too slow for technical processes. As already mentioned, it is necessary to work with elevated pressures and/or temperatures in order to appropriately increase the reaction speed.

The attack of the oxygen predominantly occurs by radical or ionic splitting of C—H and C—metal—C—C—bonds or also by the addition at double bonds. In order to initiate the reaction quickly there are required initiators which initially deliver the desired or required incipient or starting concentration of radicals, in order to start the chain reaction of the oxidative decomposition. The reaction which has once been initiated can be, however, stopped by discontinuance reactions of the type:

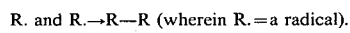

R. and R.→R—R (wherein R.=a radical).

Also the antioxidants, known as inhibitors, can prevent progress of the reaction. Therefore, it is of extreme importance that measures be provided to insure that there are always present a sufficient number of free radicals. The further course of the reaction can be controlled with suitable catalysts.

SUMMARY OF THE INVENTION

It is therefore a primary object of the present invention to provide a new and improved method of the character described which avoids the aforementioned drawbacks and shortcomings of the prior art proposals.

Still another and more specific object of the present invention aims at providing a new and improved method of reducing the chemical oxygen demand or requirement by catalytic oxidation in water which is charged with oxidizable substances, affording not only extreme reliability in operation but economies in the practice of the method.

Still a further object of the present invention aims at using the method thereof for efficiently and economically producing potable water.

DETAILED DESCRIPTION OF THE INVENTION

The present invention provides a method for the reduction of the chemical oxygen requirement or demand of water and waste water (also referred to briefly as COD, signifying Chemical Oxygen Demand), which is loaded or charged with oxidzable substances, by means of continuous catalytic oxidation and uses, as a promoter, without the use of ozone, excited dissociated and/or at least partially ionized gases and/or gas mixtures in a quantity such that there are formed a sufficient number of free radicals which initiate the oxidation and also continuously regenerate or reactivate the consumed catalyst.

The excitation, i.e. ionization or dissociation, of the gaseous reaction partner advantageously occurs by radiation or electrical energy, for instance in a field with Townsend or corona discharge. The thus produced excited, metastable, dissociated or ionized gas particles, as a general rule, react in water extremely rapidly while forming radicals leading to the formation of peroxides, for instance:

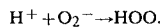

$H^+ + O_2^- \rightarrow HOO.$

For instance, these radicals react with formic acid according to the following equations:

$$H-\overset{O}{\underset{\|}{C}}-O-H + HOO\cdot \longrightarrow H\cdot\overset{O}{\underset{\|}{C}}-O + H_2O_2$$

$$H\cdot\overset{O}{\underset{\|}{C}}-O + HOO\cdot \longrightarrow CO_2 + H_2O_2$$

With the aid of suitable mixing devices there can be established any randomly desired ratio of active gas and waste water and there can be obtained extremely high concentrations of free radicals. This first step of the reaction sequence governs the speed. For domestic waste water it is sufficient, in most instances, to add 1 gram equivalent gas ion per 1 m³ waste water. The ratio of positive to negative gas ions preferably amounts to between 2:1 to 5:1.

During a next step the formed peroxy or hydroxy-compounds must be decomposed, an operation which is preferably catalytically controlled and accelerated. The catalyst, according to whether it takes-up or delivers electrons, causes for instance the following:

$$ROOH\ \&\ A - e^- \longrightarrow A^{(+)}\ \&\ RO\cdot\ \&\ OH^{(-)}$$

$$ROOH\ \&\ A\ \&\ e^- \longrightarrow A^{(-)}\ \&\ ROO\cdot\ \&\ H^{(+)}$$

$$A = \text{catalyst.}$$

There thus can be used as effective catalysts those metals which have easily transformable valences, such as for instance iron, cobalt, chromium, manganese, molybdenum, vanadium, cerium, copper and so forth, and in part they are used in the form of their oxides or salts.

$$ROOH\ \&\ Ce^{++++} \rightarrow Ce^{+++}\ \&\ ROO\cdot\ \&\ H^+$$

$$ROO\cdot\ \&\ Ce^{++++} \rightarrow Ce^{+++}\ \&\ R^+\ \&\ O_2.$$

If possible there are used insoluble catalysts. There also can be used mixtures of catalysts.

Now in order to maintain the catalyst active it must be continuously replaced or regenerated or reactivated. With batch operations such procedure can be realized without any particular difficulties. In the case of continuously operating systems the separation of the "consumed" catalyst in conjunction with the regeneration is associated with appreciable equipment and operating costs and typically at best is then tolerable where profit is of lesser importance, i.e., in those situations dealing with valuable industrial and commercial products, never however with waste water.

In contrast to all of the heretofore known procedures, the inventive method contemplates a continuous regeneration by the continuous infeed of appropriate gas ions, for instance:

$$Ce^{+++}\ \&\ O_2^+ \rightarrow Ce^{++++}\ \&\ O_2$$

$$Fe^{++}\ \&\ N_2^+ \rightarrow Fe^{+++}\ \&\ N_2$$

The catalyst can be guided within its own closed circulation system or cycle, or, however, more simply applied directly or at a carrier, always being retained in the reaction zone.

According to the method of the present invention the excitation, dissociation and/or ionization or the gaseous reaction partner is controlled in such a manner that there is always present a sufficient quantity of active gas particles in order to:

(a) have available sufficient free radicals for the start of the chain reaction, something which can be determined based upon the formation of hydroxy compounds (redox potential); and (b) continuously regenerate or maintain constantly active the catalyst.

This regulation can be accomplished by the selection of the potential in the discharge chamber or the radiation intensity, respectively, as well as the residence time of the gas and its density during activation.

With the inventive method it is possible to selectively either completely or partially oxidize the substances which load the water. The salt content of the liquid is thus normally not increased.

The air or gas quantity can be admixed in such a manner that apart from the oxidation there occurs a saturation, at least an enrichment of dissolved oxygen.

There has been advantageously determined a further excess of activated gas particles, since they themselves and the oxygen forming during the reactions in statu nascendi possess as is known a pronounced degermination effect.

The oxidation can be controlled in such a manner that the treated waste water has a redox potential above +450 milli-volts. With this mode of operation it is possible to insure that the waste water is sterile. Hence, the method is not only suitable for treatment of waste water, rather also for the purification and preparation of drinking water.

A particular exemplary embodiment of the inventive method contemplates the performance thereof by means of partial currents, in that practical operation of such waste water purification plants has shown that it is not always necessary to admix all of the waste water with the active gas. Oftentimes it is adequate if a partial current or partial flow is treated and if such is delivered together with the remainder over the catalyst. In this case it is however necessary that during the catalysis there is available sufficient oxygen for the oxidation of the contaminants, which can be achieved by infeeding normal atomspheric air.

The invention will be further explained based upon the following Examples:

EXAMPLE 1

Mechanically pre-purified community waste water having a chemical oxygen demand (COD) of 200 mg/l is intensively admixed with atmospheric air in a suitable reaction or material exchange system, which previously has been at least partially excited, dissociated and/or ionized by quiet discharges. The addition of active gas should amount to at least 1 gram equivalent per 1 m³ water.

In the so-impregnated water there immediately form a sufficient number of radicals from which there are formed hydroxy compounds. The water is then immediately brought into contact with a manganese catalyst which completes the initiated oxidation as a chain reaction. The infed active gas particles are also sufficient for maintaining active the manganese catalyst. The result of the treatment which lasted for only two minutes showed a chemical oxygen demand of 19 mg/l.

EXAMPLE 2

Industrial waste water having a content of 150 mg/l phenol is intensively admixed with atmospheric air in a suitable reaction or material exchange system, the air previously having been partially ionized in a chamber by means of corona discharge. For each cubic meter of waste water there should be infed at least 2 gram equivalent gas ions in 10 m³ air. The air-water mixture is brought into contact with a copper talyst. The drained water exhibited a phenol content of less than 0.01 mg/l. The residence time in the installation amounted to one minute.

EXAMPLE 3

Mechanically pre-clarified waste water was treated, wherein a partial stream or current thereof amounting to 20% of the total volume was admixed with active gas and thereafter again recombined with the main stream and guided over a molybdenum catalyst and at the same time there was introduced atmospheric air having an oxygen content adequate for complete oxidation.

Protection by Letters Patent of this invention in all its aspects as the same are set forth in the appended claims is sought to the broadest extent that the prior art allows.

What is claimed is:

1. A method for reducing the chemical oxygen demand of water loaded with oxidizable substances by continuous oxidation in the presence of a catalyst, without the use of ozone, comprising:
   (1) producing excited, dissociated, or at least partially ionized atmospheric air, without producing ozone,
   (2) mixing the water with a sufficient amount of the thus excited, dissociated, or at least partially ionized air whereby a sufficient number of free radicals are formed to initiate the oxidation of the oxidizable substances in the presence of the catalyst and to continuously regenerate or reactivate the catalyst.

2. The method as defined in claim 1, wherein:
   the ratio of the positive to negative ions of the ionized gas or gas mixture is in the order of about 2:1 to 5:1.

3. The method as defined in claim 1, further including the step of:
   using as the catalyst metallic catalysts having mutually easily transferable valences.

4. The method as defined in claim 3, wherein:
   said catalysts comprise insoluble catalysts.

5. The method as defined in claim 3, further including the step of:
   using mixtures of said catalysts.

6. The method as defined in claim 1, further including the step of:
   completely oxidizing the substances loading the water.

7. The method as defined in claim 1, further including the step of:
   partially oxidizing the substances loading the water.

8. The method as defined in claim 1, further including the step of:
   admixing a quantity of gas containing air or oxygen in an amount such that apart from the oxidation there occurs at least an enrichment of dissolved oxygen.

9. The method as defined in claim 8, wherein:
   said gas quantity which is admixed produces a saturation of dissolved oxygen.

10. The method as defined in claim 1, further including the step of:
    providing a concentration of ionized gas adequate for degermination of the treated water or waste water.

11. The method as defined in claim 1 wherein the water, after the oxidation treatment, has a redox potential exceeding +450 millivolts.

12. The method of claim 1 wherein a portion of the water to be treated is contacted with the ionized gas, recombined with the remaining portion and the combined portions are contacted with the catalyst.

13. The method of claim 1 wherein the product is drinkable water.

* * * * *